United States Patent
Liu

(10) Patent No.: US 11,544,044 B2
(45) Date of Patent: *Jan. 3, 2023

(54) METHODS, BLOCKCHAIN NODES, AND STORAGE MEDIA FOR EXECUTING SMART CONTRACT

(71) Applicant: ALIPAY (HANGZHOU) INFORMATION TECHNOLOGY CO., LTD., Zhejiang (CN)

(72) Inventor: Qi Liu, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/363,520

(22) Filed: Jun. 30, 2021

(65) Prior Publication Data

US 2021/0342131 A1 Nov. 4, 2021

(30) Foreign Application Priority Data

Aug. 31, 2020 (CN) .......................... 202010901429.3

(51) Int. Cl.
*G06F 8/41* (2018.01)
*G06F 16/23* (2019.01)
(Continued)

(52) U.S. Cl.
CPC ............ *G06F 8/41* (2013.01); *G06F 16/2315* (2019.01); *G06Q 10/10* (2013.01); *G06Q 20/389* (2013.01)

(58) Field of Classification Search
CPC ....... G06F 8/41; G06F 16/2315; G06Q 10/10; G06Q 20/389
See application file for complete search history.

(56) References Cited

U.S. PATENT DOCUMENTS 10,871,948 B1 * 12/2020 Dowling ................ G06Q 20/02
11,036,614 B1 * 6/2021 Huang ................... H04L 9/3239
(Continued)

FOREIGN PATENT DOCUMENTS

| CN | 108765158 | 11/2018 |
|----|-----------|---------|
| CN | 110032883 | 7/2019 |

(Continued)

OTHER PUBLICATIONS

Shen Wang et al., "Blockchain-Assisted Crowdsourced Energy Systems", [Online], pp. 1-5, [Retrieved from Internt on Jun. 18, 2022], <https://arxiv.org/pdf/1802.03099.pdf> (Year: 2018).*

(Continued)

*Primary Examiner* — Ziaul A Chowdhury
(74) *Attorney, Agent, or Firm* — Fish & Richardson P.C.

(57) ABSTRACT

Methods, systems, and apparatus for executing a smart contract by a blockchain node of a blockchain. An example method includes receiving bytecode of a smart contract; deploying the smart contract, comprising storing the bytecode of the smart contract on the blockchain; compiling, through Just-In-Time (JIT) compilation, the bytecode of the smart contract into machine code; locally storing the machine code in a memory of the blockchain node; and executing the smart contract deployed on the blockchain, comprising determining whether the machine code corresponding to the bytecode of the smart contract is locally stored in the memory of the blockchain node, and interpreting and executing the bytecode of the smart contract if the machine code corresponding to the bytecode of the smart contract is not locally stored.

20 Claims, 10 Drawing Sheets

(51) Int. Cl.
*G06Q 10/10* (2012.01)
*G06Q 20/38* (2012.01)

(56) References Cited

U.S. PATENT DOCUMENTS

| | | | | |
|---|---|---|---|---|
| 11,170,346 | B2* | 11/2021 | Tummuru | H04L 9/3236 |
| 2005/0257202 | A1* | 11/2005 | Kaestner | G06F 9/45516 |
| | | | | 717/153 |
| 2015/0178051 | A1* | 6/2015 | Miadowicz | G06F 9/45504 |
| | | | | 717/114 |
| 2015/0178054 | A1 | 6/2015 | Delsart | |
| 2020/0133926 | A1 | 4/2020 | Sun | |
| 2020/0380624 | A1* | 12/2020 | Turgman | G06Q 50/18 |
| 2021/0035212 | A1* | 2/2021 | Chan | G06Q 40/04 |
| 2021/0149884 | A1* | 5/2021 | Xie | G06F 16/2379 |
| 2021/0150524 | A1* | 5/2021 | Yan | G06F 21/6218 |

FOREIGN PATENT DOCUMENTS

| | | |
|---|---|---|
| CN | 110033368 A | 7/2019 |
| CN | 110569108 | 12/2019 |
| CN | 110675256 A | 1/2020 |
| CN | 111061484 | 4/2020 |
| CN | 111078318 A | 4/2020 |
| CN | 111176625 A | 5/2020 |
| CN | 111179086 | 5/2020 |
| EP | 3542494 A2 | 9/2019 |
| WO | WO 2019034959 | 2/2019 |
| WO | 2019072310 A2 | 4/2019 |

OTHER PUBLICATIONS

Joshua Ellul et al., "AlkylVM: A Virtual Machine for Smart Contract Blockchain Connected Internet of Things", [Online], pp. 1-4, [Retrieved from Internet on Jun. 18, 2022], <https://ieeexplore.ieee.org/stamp/stamp.jsp?arnumber=8328732> (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Appln. No. 21181939.6, dated Dec. 8, 2021, 9 pages.

* cited by examiner

METHODS, BLOCKCHAIN NODES, AND STORAGE MEDIA FOR EXECUTING SMART CONTRACT

CROSS-REFERENCE TO RELATED APPLICATIONS

This application claims priority to Chinese Patent Application No. 202010901429.3, filed on Aug. 31, 2020, which is hereby incorporated by reference in its entirety.

TECHNICAL FIELD

Embodiments of the present specification relate to the field of blockchain technologies, and in particular, to methods, blockchain nodes, and storage media for executing a smart contract.

BACKGROUND

A blockchain is a new application mode of computer technologies such as distributed data storage, point-to-point transmission, consensus mechanisms, and encryption algorithms. In the era of blockchain 2.0, smart contracts have emerged, which extends an application scope of the blockchain to a new level. Because of the smart contract, a blockchain can invoke a piece of code which can be user-defined in addition to performing a single transfer transaction.

SUMMARY

The present specification provides methods, blockchain nodes, and storage media for executing a smart contract.

The methods, blockchain nodes, and storage media for executing a smart contract provided in the embodiments of the present specification are implemented as follows:

A method for executing a smart contract is provided, and includes the following:

A blockchain node receives a request for creating a smart contract, where the request includes bytecode of the smart contract; after deploying the smart contract, the blockchain node compiles the bytecode of the smart contract into machine code through Just-In-Time (JIT) compilation and stores the machine code; and when executing the deployed smart contract, the blockchain node interprets and executes the bytecode of the smart contract if the machine code corresponding to the bytecode of the smart contract is not locally stored.

A method for executing a smart contract is provided, and includes the following:

After deploying bytecode of a smart contract, a blockchain node compiles the bytecode of the smart contract into machine code through JIT compilation and stores the machine code; and when executing the deployed smart contract, the blockchain node interprets and executes the bytecode of the smart contract if the machine code corresponding to the bytecode of the smart contract is not locally stored.

A blockchain node for executing a smart contract is provided, and is configured to perform any one of the previously described methods.

A blockchain node for executing a smart contract is provided, and includes: a processor; and a memory. The memory stores a program, and when the processor executes the program, any one of the previously described methods is performed.

A storage medium is provided, and is configured to store a program. When the program is executed, any one of the previously described operations is performed.

In the embodiments of the present application, when local compilation has not been completed, the bytecode of the smart contract is interpreted and executed, so that normal processing of a blockchain service request can be ensured while local compilation is performed.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description are merely some of the embodiments described in the present specification. A person of ordinary skill in the art can further derive other drawings from these accompanying drawings without creative efforts.

FIG. 6-1 is a flowchart illustrating executing a smart contract, according to embodiments;

FIG. 6-2 is a flowchart illustrating executing a smart contract, according to other embodiments;

DETAILED DESCRIPTION OF EMBODIMENTS

Figure 1:
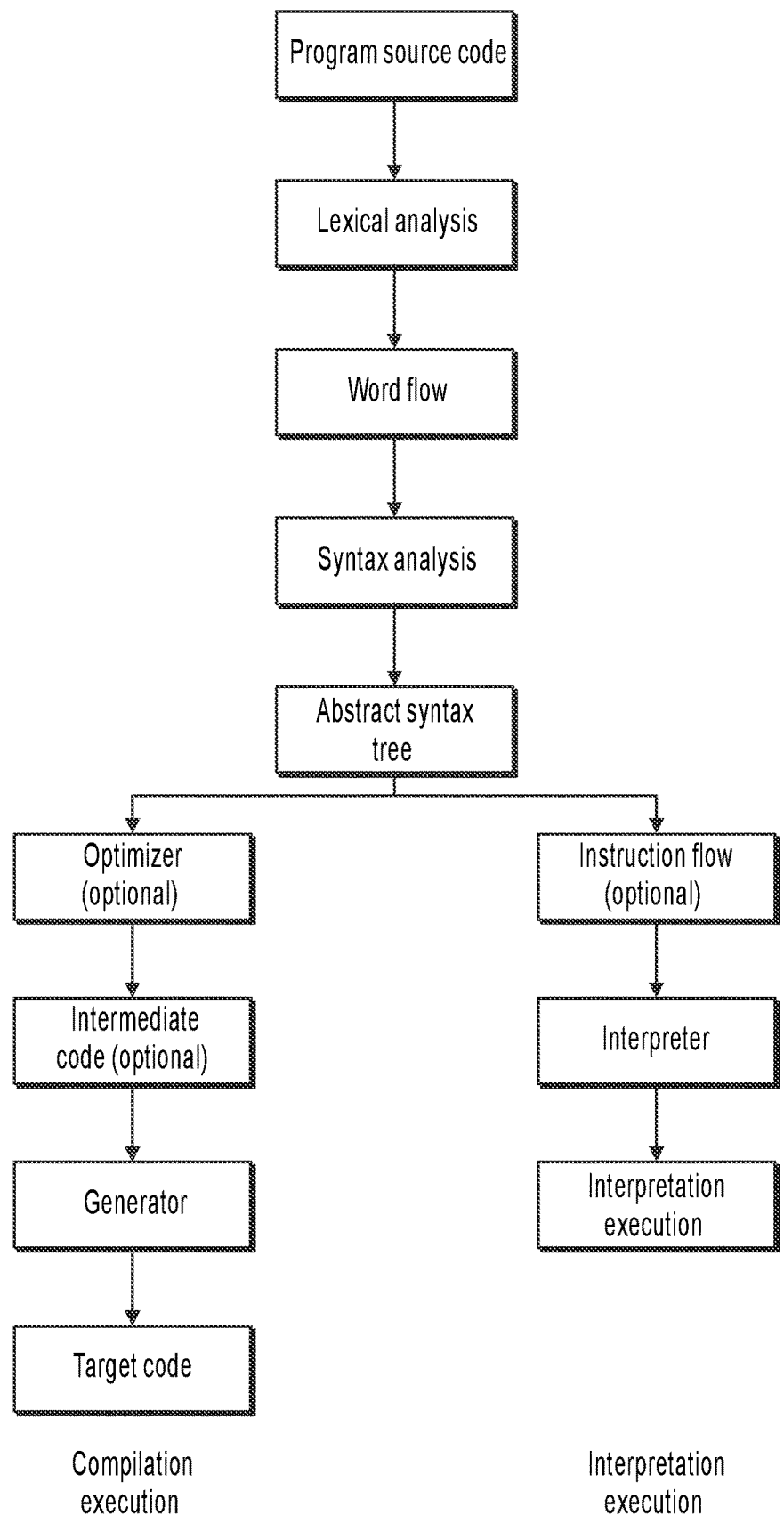
FIG. 1 is a schematic diagram illustrating a principle of compilation and execution and a principle of interpretation and execution, according to embodiments.

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the present specification.

The era of blockchain 1.0 usually refers to the blockchain application and development stage represented by Bitcoin between 2009 and 2014, and is mainly focused on solving the problem of decentralization of currency and means of payment. Since 2014, developers have paid increasing attention on addressing technical and scalability weaknesses of Bitcoin. At the end of 2013, Vitalik Buterin published the Ethereum white paper "Ethereum: A Next-Generation Smart Contract and Decentralized Application Platform", which introduces smart contracts into a blockchain and opens up the application of the blockchain outside the currency field, thereby ushering in the era of blockchain 2.0.

Smart contracts are computer contracts that are automatically executed based on defined trigger rules, and can also be considered as digital versions of conventional contracts. The concept of smart contract was first proposed by Nick Szabo, a cross-disciplinary legal scholar and cryptography researcher, in 1994. This technology is not put into practice due to the lack of programmable digital systems and related technologies until the emergence of blockchain technologies and Ethereum provides a reliable execution environment. A blockchain ledger is used in the blockchain technology, and therefore generated data cannot be tampered with or deleted, and new ledger data will be continuously added to the entire ledger, thereby ensuring the traceability of historical data. In addition, a decentralized operation mechanism avoids impact of centralization factors. The blockchain technology-based smart contract can not only give full play to the advantages of the smart contract in terms of cost and efficiency, but also prevent malicious behavior from interfering with the normal execution of the contract. The smart contract is written into the blockchain in a digital form, and the characteristics of the blockchain technology ensure that the entire process of storage, reading, and execution is transparent, traceable, and tamper-resistant.

The smart contract is essentially a computer-executable program. Like computer programs widely used nowadays, the smart contract can be written in high-level languages (for example, C language and C++ language). Program code of the smart contract written in the high-level language usually can be converted by a "compiler" into "machine code" that can be identified and run by a central processing unit (CPU) of a computer, and then such machine code (or referred to as a "microprocessor instruction") can be executed by the CPU. This is usually referred to as "compilation and execution".

Cross-platform scalability is usually not supported for compilation and execution. There are CPUs of different manufacturers, different brands, and different generations, and these different CPUs usually support different instruction sets in many cases, for example, x86 instruction sets and ARM instruction sets, and instruction sets supported by CPUs that are of the same manufacturer and the same brand and of different generations (for example, Intel CPUs of different generations) are not exactly the same. Therefore, the same program code written in the same high-level language can be converted by the compiler into different machine code on different CPUs. Specifically, in a process of converting the program code written in the high-level language into the machine code by the compiler, optimization is performed with reference to characteristics of a specific CPU instruction set (for example, a vector instruction set) to increase the program execution speed. Such optimization is usually related to specific CPU hardware. As such, the same machine code which can run on an x86 platform may not run on an ARM platform. Even for x86 platforms, as the instruction set is continuously enriched and expanded over time, different machine code has to run on different generations of x86 platforms. In addition, the CPU needs to be scheduled by a kernel of an operating system to execute the machine code. Therefore, even for the same hardware, different machine code may be supported under different operating systems.

Different from compilation and execution, there is a program running mode of "interpretation and execution". For example, in the Java language, Java source code is compiled into standard bytecode by a Java compiler. Here, the compiler is not specific to an instruction set of any hardware processor, but a set of abstract standard instruction sets is defined. The compiled standard bytecode usually cannot directly run on a hardware CPU. Therefore, a virtual machine, namely, a Java virtual machine (JVM), is introduced. The JVM runs on a specific hardware processor to interpret and execute the compiled standard bytecode.

JVM is the abbreviation of Java Virtual Machine, is a virtual computer, and is usually implemented by simulating various computer functions on an actual computer. The JVM shields information related to specific hardware platforms, operating systems, etc., so that Java programs can run on multiple platforms without modification provided that the Java programs are generated standard bytecode that can run on the JVM.

A very important characteristic of the Java language is its independence from the platform. The use of the JVM is the key to achieving this characteristic. Usually, high-level languages at least need to be compiled into different object code if the high-level languages are to run on different platforms. With the introduction of a Java language virtual machine, the Java language does not need to be recompiled to run on different platforms. In the Java language, information related to specific platforms is shielded by using the JVM, so that Java language compiler programs can run on multiple platforms without modification provided that the Java language compiler programs can generate object code (bytecode) that runs on the JVM. When executing the bytecode, the JVM interprets the bytecode as a machine instruction on a specific platform for execution. That is why Java can "run everywhere after being compiled once".

The JVM runs on a specific hardware processor, is responsible for the interpretation and execution of the bytecode for the specific processor on which the JVM runs, upwardly shields underlying differences, and presents developers with standard development specifications. When executing the bytecode, the JVM actually and finally interprets the bytecode as a machine instruction on a specific platform for execution. Specifically, after receiving the input bytecode, the JVM interprets each instruction in the bytecode sentence by sentence, and translates the instruction into machine code suitable for a current machine for running. These processes are interpreted and executed, for example, by a complier such as an interpreter. As such, developers who write Java programs do not need to consider hardware platforms on which the written program code is to run. The JVM is developed by professional developers in the Java organization to adapt the JVM to different processor architectures. So far, there are only a limited number of mainstream processor architectures, for example, x86, ARM, RISC-V, and MIPS. After the professional developers port the JVM respectively to platforms that support these specific types of hardware, Java programs can theoretically run on all machines. The JVM is usually ported by the professionals in the Java development organization, which greatly reduces the burden on Java application developers.

Interpretation and execution bring cross-platform portability. However, the intermediate process of translation by the JVM is performed in the execution of the bytecode, and therefore execution efficiency is not as high as that of compilation and execution, and the difference in efficiency can sometimes even reach dozens of times.

FIG. 1 illustrates similarities and differences between compilation and execution and interpretation and execution. Regardless of interpretation and execution or compilation and execution, and regardless of a physical machine or a virtual machine, it is impossible for a machine to read and understand an application program like a human, and then gain the execution ability. Steps in FIG. 1 need to be performed for most of the program code before the program code is converted into object code of the physical machine or an instruction set that can be executed by the virtual machine. In FIG. 1, the branch from the top to the left is a process of generating object code from program code in a conventional compilation principle, and the branch from the top to the right is a process of interpretation and execution. Nowadays, most languages based on physical machines, JVMs, or other non-Java high-level language virtual machines (HLLVM) follow this idea based on modern classical compilation principles. Lexical analysis and syntax analysis are performed on program source code before execution, and the source code is converted into an abstract syntax tree (AST). For implementation of a specific language, lexical analysis, syntax analysis, an optimizer, and an object code generator can all be independent of an execution engine to form a full-meaning compiler for implementation. This is represented by the C or C++ language. Alternatively, some of these steps (for example, the steps before the abstract syntax tree is generated), can be implemented as a semi-independent compiler. This is represented by the Java language. Alternatively, all these steps and the execution engine are encapsulated in a closed black box, for example, most JavaScript executors.

To balance cross-platform portability and high performance as much as possible, the concept of Just-In-Time (JIT) compiler is proposed. The core idea of JIT is "how to efficiently avoid repetitive work of interpreting instructions". There is a lot of code repeatedly executed in a computer program. For example, some computation "functions" may be repeatedly invoked multiple times during execution of a program. In the case of interpretation and execution, the function needs to be translated from bytecode to machine code every time a loop process is performed. In practice, however, machine code generated by translating this function for dozens of times is exactly the same. Naturally, after the first translation, the translated machine code of the function is cached. In a subsequent execution process, no translation needs to be performed again, and the cached code is directly used. As such, execution efficiency can be improved.

On the contrary, some functions are executed only once in a program running cycle (for example, startup initialization). Therefore, such functions do not need to be cached, and can be directly interpreted and executed once. Therefore, a core module in a JIT technology is "hotspot analysis". That is, code that has been executed multiple times is obtained through analysis in a program execution process, to cache translated machine code of the code that has been executed multiple times. Operations that are executed relatively fewer times do not need to be cached. As such, an optimal balance can be achieved between execution efficiency and memory overheads.

In addition, another core module in the JIT technology is compilation optimization (or referred to as optimized compilation). For directly translated machine code, no optimization is performed with reference to context, and only high-frequency machine code is cached. Consequently, there is limited space for performance improvement. To achieve better performance, the compiler can be further optimized. It usually takes more time to implement compilation optimization.

Figure 2:
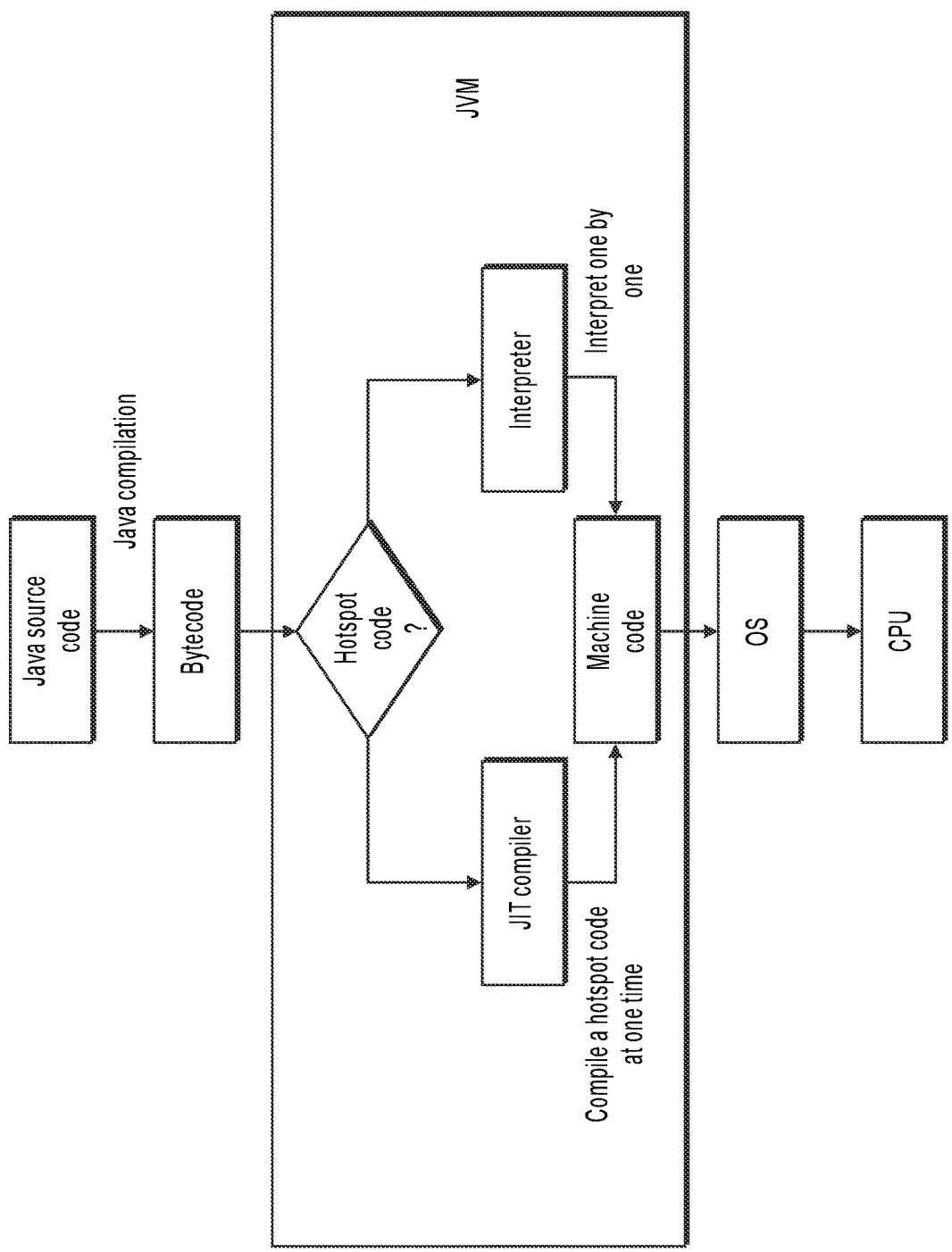
FIG. 2 is a schematic diagram illustrating a principle of interpretation and execution and a principle of Just-In-Time (JIT), according to embodiments.

A working principle of JIT is shown in FIG. 2. Java source code is compiled by a Java compiler to generate a piece of Java bytecode. The Java bytecode is distributed to two execution paths (JIT compiler and interpreter) after hotspot analysis. Code that is determined as a hotspot (frequently executed) is compiled by the JIT compiler to obtain machine code, and the machine code is cached and executed. The machine code is usually executed by a CPU under the control of an operating system (OS). Low-frequency code enters the interpreter, and is translated into machine code, and then the machine code is executed by the CPU under the control of the OS.

Due to contextual relevance of program code, there is usually plenty of space for optimization in the compilation process. Optimized machine code is much more efficiently executed than the directly translated machine code. The compiler is required to be optimized to achieve better performance. The process of compiling by the JIT compiler can be time-consuming. In particular, it may take a long time for the JIT compiler to compile the bytecode for the first time, and it may even be worse than interpretation and execution. Therefore, for some Java programs, if there is not a very prominent hotspot, that is, the overall execution frequency is not very high, and the overall execution process is very long, it is difficult to fully realize the advantage of JIT in compilation and execution.

Figure 8:
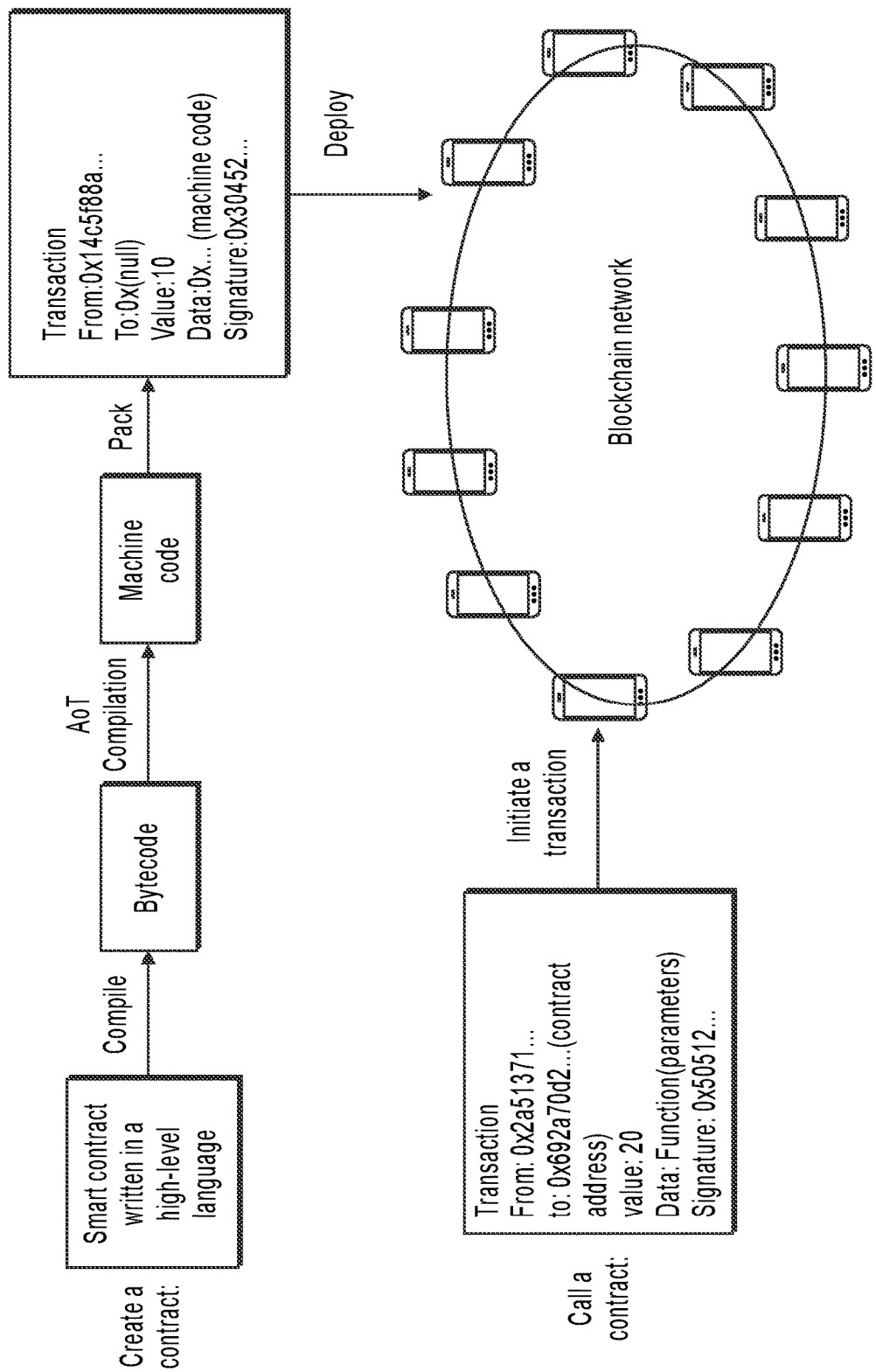
FIG. 8 is a schematic diagram illustrating creating and invoking a smart contract, according to embodiments.

In addition, another idea, namely, Ahead of Time (AoT), is proposed. AoT is equivalent to a pre-compilation and execution method. Before a program runs, bytecode is compiled once for a target execution environment to obtain machine code, and then the machine code is deployed on a target machine for execution, for example, the process shown in FIG. 8. The running efficiency of AoT can achieve the effect of compilation and execution, but in the case of AoT, it is necessary to clearly know hardware, an instruction set architecture, a system, etc. of a target system to ensure that compiled code can run. In addition, for instructions of the same function, the number of statements needed to express the instructions of the same function in machine code is usually greater than that needed to express the instructions of the same function in bytecode, and much greater than that needed to express the instructions of the same function in code written in a high-level language. Therefore, for programs with the same content, it is likely that a size of the machine code>a size of the bytecode>a size of the high-level language code. Bytecode can be compiled into machine code through AoT on the premise of clearly knowing the hardware, instruction set architecture, system, etc. of the target system. Furthermore, different types of target systems correspond to different machine code. Therefore, different versions of machine code may need to be provided to ensure that there is corresponding machine code that can be correctly executed on various target systems. Therefore, the total size of the machine code is usually greater than that of the bytecode or the high-level language code.

For example, a Dalvik virtual machine is used in an Android version earlier than version 5.0, and an ART virtual machine is used in an Android version later than version 5.0. A JIT compiler is used to interpret bytecode in the Dalvik virtual machine, while an AoT mechanism is used in the ART virtual machine. In the type of ART, when an APP is installed, bytecode is precompiled (a process of installing the Android application (APP) is actually a process of installing the bytecode of the application) into machine code. After the code interpretation process is removed, the Android APP can be more efficiently executed and started faster.

Distributed consistency needs to be maintained in a blockchain that serves as a decentralized distributed system.

Specifically, each node in a group of nodes in the distributed system has a built-in state machine. Each state machine needs to execute the same instructions in the same order from the same initial state, and changes into the same state every time, to ensure that a final consistent state is reached. It is difficult for node devices in the same blockchain network to have the same hardware configuration and software environment. Therefore, in Ethereum, as a representative in blockchain 2.0, to ensure that processes and results of executing the smart contract on nodes are the same, a virtual machine similar to the JVM, namely, an Ethereum virtual machine (EVM), is used. Differences of the nodes in the hardware configuration and software environment can be shielded by using the EVM. As such, developers can develop a set of smart contract code, locally compile the smart contract code, and upload compiled bytecode to the blockchain. After each node interprets and executes the same bytecode through the same EVM in the same initial state, the same final result and the same intermediate result can be obtained, and underlying hardware and environment differences of different nodes can be shielded. As such, with the emergence of the decentralized blockchain technology, the smart contract, which was proposed as early as 1994, is implemented. In addition, due to the implementation of decentralization, differences in the hardware and operating environment of different execution machines inevitably appear, and therefore the smart contract is further processed by using the interpretation and execution method, to ensure that the same execution result can be obtained on multiple decentralized machines with different hardware and operating environments.

The EVM is a Turing-complete virtual machine, which means that various types of complex logic can be implemented through the EVM. This is also one of the biggest improvements of Ethereum that serves as the representative of blockchain 2.0 over blockchain 1.0. Smart contracts published and invoked by users in Ethereum can run on the EVM. As described above, bytecode directly runs on the EVM, and smart contracts deployed in the blockchain can be in the form of bytecode.

Figure 3:
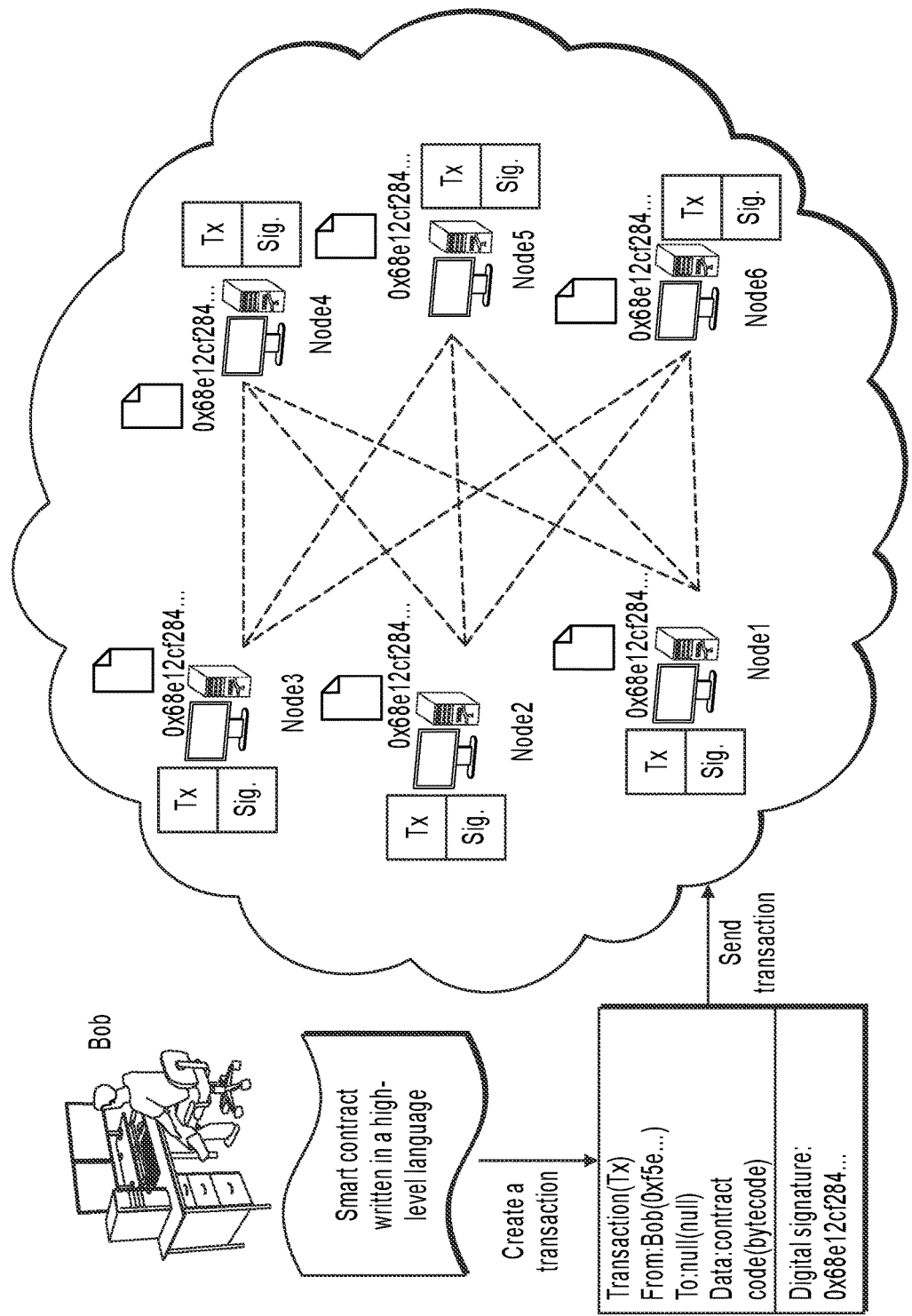
FIG. 3 is a schematic diagram illustrating a process of creating a smart contract, according to embodiments.

As shown in FIG. 3, after Bob sends a transaction that includes information used for creating a smart contract to an Ethereum network, an EVM at node 1 can execute the transaction, and generate a corresponding contract instance. In FIG. 3, a data field of the transaction can store bytecode, and a to field of the transaction can be a null address. After nodes reach an agreement through a consensus mechanism, the contract is successfully created, and subsequently a user can invoke the contract.

After the contract is created, a contract account corresponding to the smart contract appears in the blockchain and has a specific address. Contract code and an account storage can be stored in the contract account. The behavior of the smart contract is controlled by the contract code, and the account storage of the smart contract stores a state of the contract. In other words, the smart contract enables a virtual account that includes the contract code and the account storage to be generated in the blockchain.

As described above, the data field of the transaction that includes the creation of the smart contract can store the bytecode of the smart contract. The bytecode includes a series of bytes, and each byte can indicate one operation. In consideration of development efficiency, readability, etc., developers can choose a high-level language to write smart contract code instead of directly writing the bytecode. The smart contract code written in the high-level language is compiled by a compiler to generate bytecode, and then the bytecode can be deployed in the blockchain. Ethereum supports many high-level languages, for example, Solidity, Serpent, and LLL languages.

The Solidity language is used as an example. A contract written in the Solidity language is very similar to a class in an object-oriented programming language. Multiple members can be declared in a contract, including state variables, functions, function modifiers, events, etc. The state variable is a value permanently stored in the account storage of the smart contract, and is used to store the state of the contract.

The following is code example 1 of a simple smart contract written in the Solidity language:

```
Contract Example{
   int balance;
   function C( ){
      balance + = 1;
   }
function getbalance( ) returns(int){
   return balance;
}
}
```

Typically, after the contract is deployed in the blockchain, the state variable "balance" can be a new asset type defined in the contract. The function "function C( )" can define a change operation of balance. The function "function getbalance( ) returns(int)" can define an operation of obtaining a current value of balance and returning the value.

Figure 4:
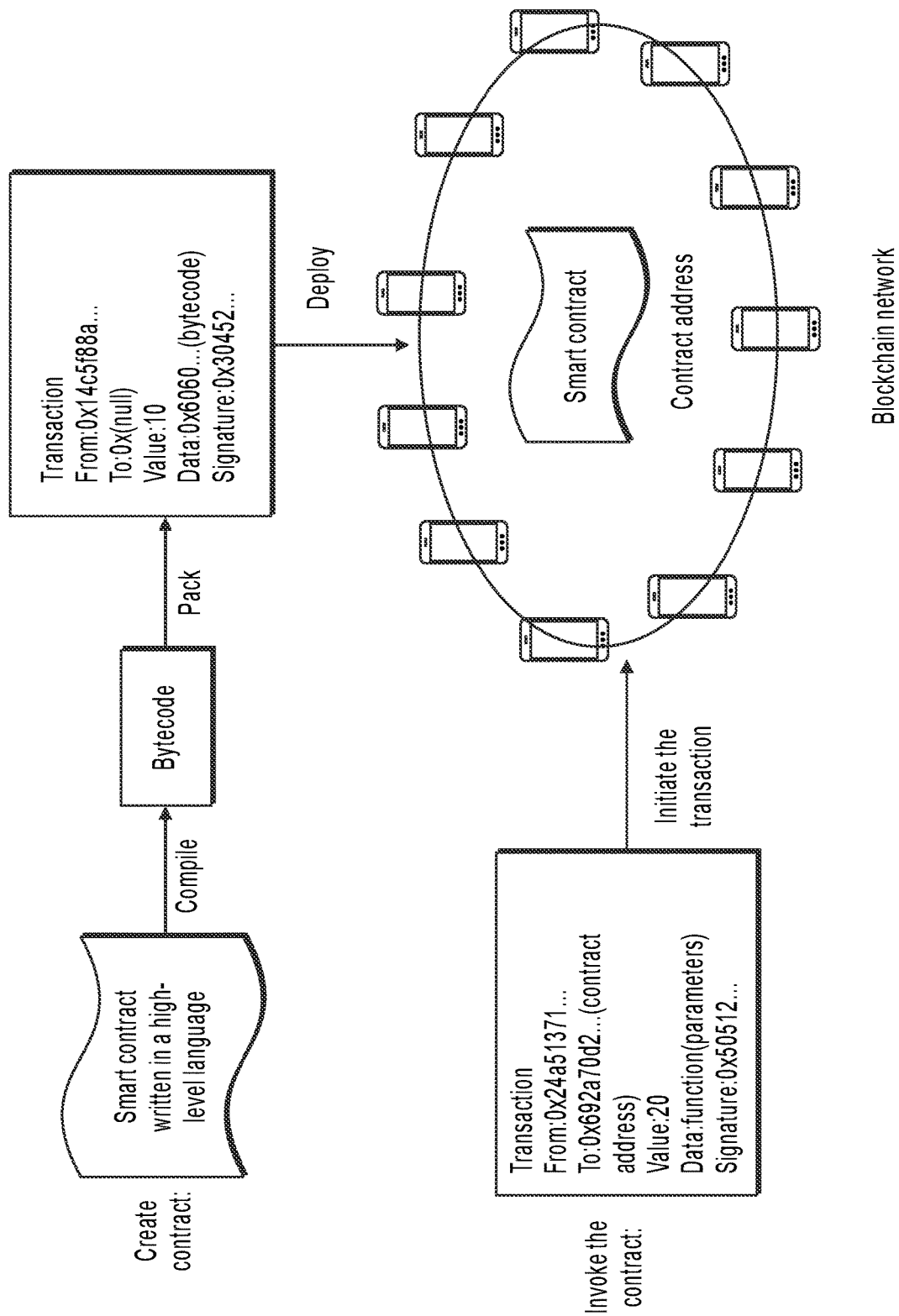
FIG. 4 is a schematic diagram illustrating a process of invoking a smart contract, according to embodiments.

In addition, as shown in FIG. 4, Ethereum is still used as an example. After Bob sends a transaction that includes information used for invoking a smart contract to the Ethereum network, the EVM at node 1 can execute the transaction, and generate a corresponding contract instance. In FIG. 4, the from field of the transaction is an address of an account that initiates invocation of the smart contract, "0x692a70d2 . . . " in the to field represents an address of the smart contract to be invoked, a value field is a value of Ether in Ethereum, and a data field of the transaction stores a method and parameters for invoking the smart contract. After the smart contract is invoked, the value of balance may change. Subsequently, a certain client can view the current value of balance through a certain blockchain node.

The smart contract can be executed independently by each node in the blockchain network by using a predetermined method, and all execution records and data are stored in the blockchain, so that after the transaction is completed, the blockchain stores a transaction certificate that cannot be tampered with and will not be lost.

Figure 5:
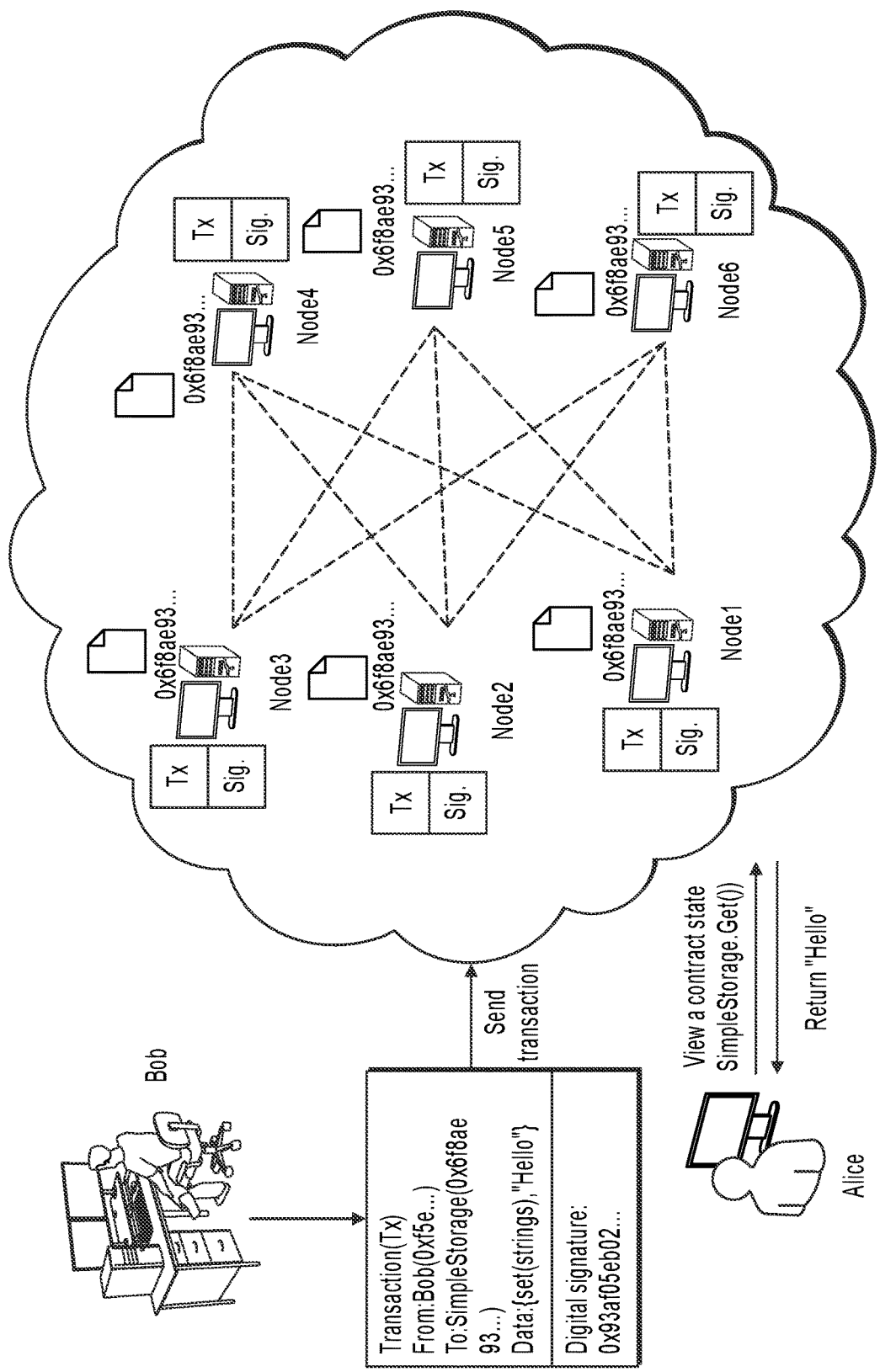
FIG. 5 is a schematic diagram illustrating creating and invoking a smart contract, according to embodiments.

A schematic diagram of creating and invoking a smart contract is shown in FIG. 5. To create a smart contract in Ethereum, processes such as writing a smart contract, converting the smart contract into bytecode (for example, compiling the smart contract into the bytecode by using a compilation tool such as Solc or C++), and deploying the bytecode in a blockchain need to be performed. Invoking a smart contract in Ethereum is to initiate a transaction that points to an address of a smart contract (the transaction can point to the address of the smart contract by using a to field of the transaction). Code of the smart contract runs on a virtual machine at each node in an Ethereum network in a distributed way.

Figure 9:
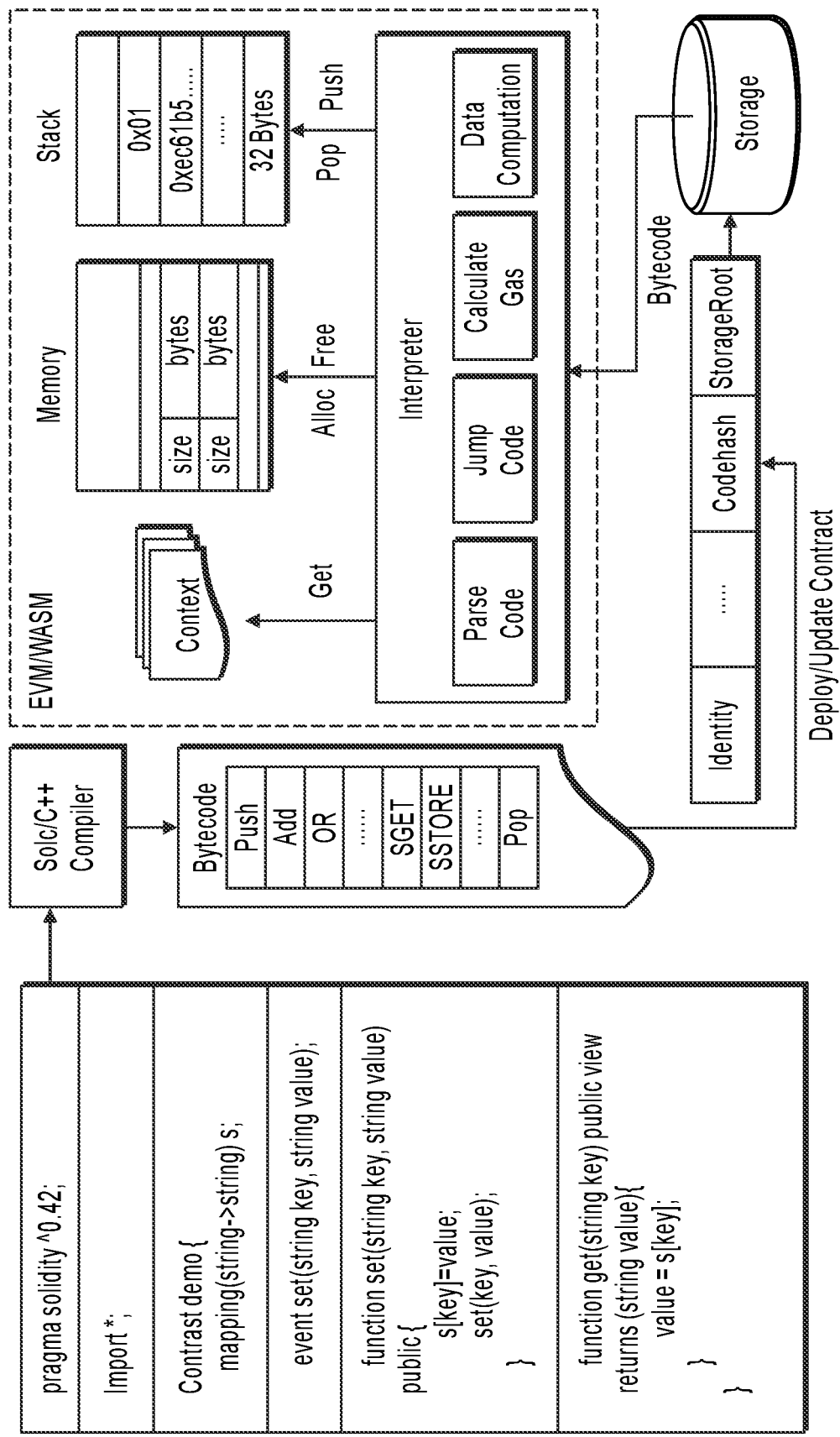
FIG. 9 is a schematic diagram illustrating a process that is of creating and invoking a smart contract and includes a process of execution by a virtual machine, according to embodiments.

A transaction for creating a smart contract is sent to the blockchain, and after a consensus is reached, each blockchain node can execute the transaction. Specifically, the transaction can be executed by an EVM or a web assembly (WASM) at the blockchain node. As described above, a contract account (including, for example, an identity of the account, a hash value Codehash of the contract, and a root StorageRoot of a contract storage) corresponding to the smart contract appears in the blockchain at this time, and has a specific address. Contract code and an account storage can be stored in a storage of the contract account, as shown in FIG. 9. The behavior of the smart contract is controlled by the contract code, and the account storage of the smart contract stores a state of the contract. In other words, the smart contract enables a virtual account that includes the contract code and the account storage to be generated in the blockchain. For a contract deployment transaction or a contract update transaction, a value of Codehash can be generated or changed. Subsequently, the blockchain node can receive a transaction request for invoking the deployed smart contract. The transaction request can include an address of the contract to be invoked, a function in the contract to be invoked, and input parameters. Usually, after a consensus is reached on the transaction request, each blockchain node can independently execute the designated smart contract to be invoked. Specifically, as shown in FIG. 9, the node can load bytecode of the contract from the storage into a virtual machine (the EVM or the WASM) based on the address of the contract. An interpreter then interprets and executes the bytecode, for example, parses the bytecode of the contract to be invoked to obtain an operation code (opcode), and stores the opcode in a memory of the virtual machine. In addition, an address of a function to be invoked is obtained. After the gas to be consumed in executing the contract is calculated and there is sufficient gas, a jump to a corresponding address of the memory is made, to obtain an opcode of the function to be invoked, and then the opcode starts to be executed, and data operated by using the opcode of the function to be invoked is calculated (data computation), pushed into/pushed out of a stack, etc., to complete data calculation. In this process, some context information of the contract may also be needed, for example, a block number and information about an invocation initiator of the contract. The information can be obtained from context (a get operation). Finally, a generated state is stored in the storage by invoking a storage interface. It is worthwhile to note that in the contract creation process, some functions in the contract may be interpreted and executed, for example, a function of an initialization operation. At this time, code is parsed, jump instructions are generated and stored in the memory, data is operated in the stack, etc. In the previously described interpretation and execution process, repeatedly executed functions are not cached, and even for functions executed multiple times, the virtual machine needs to repeat the parsing and execution process.

Figures 1, 6:
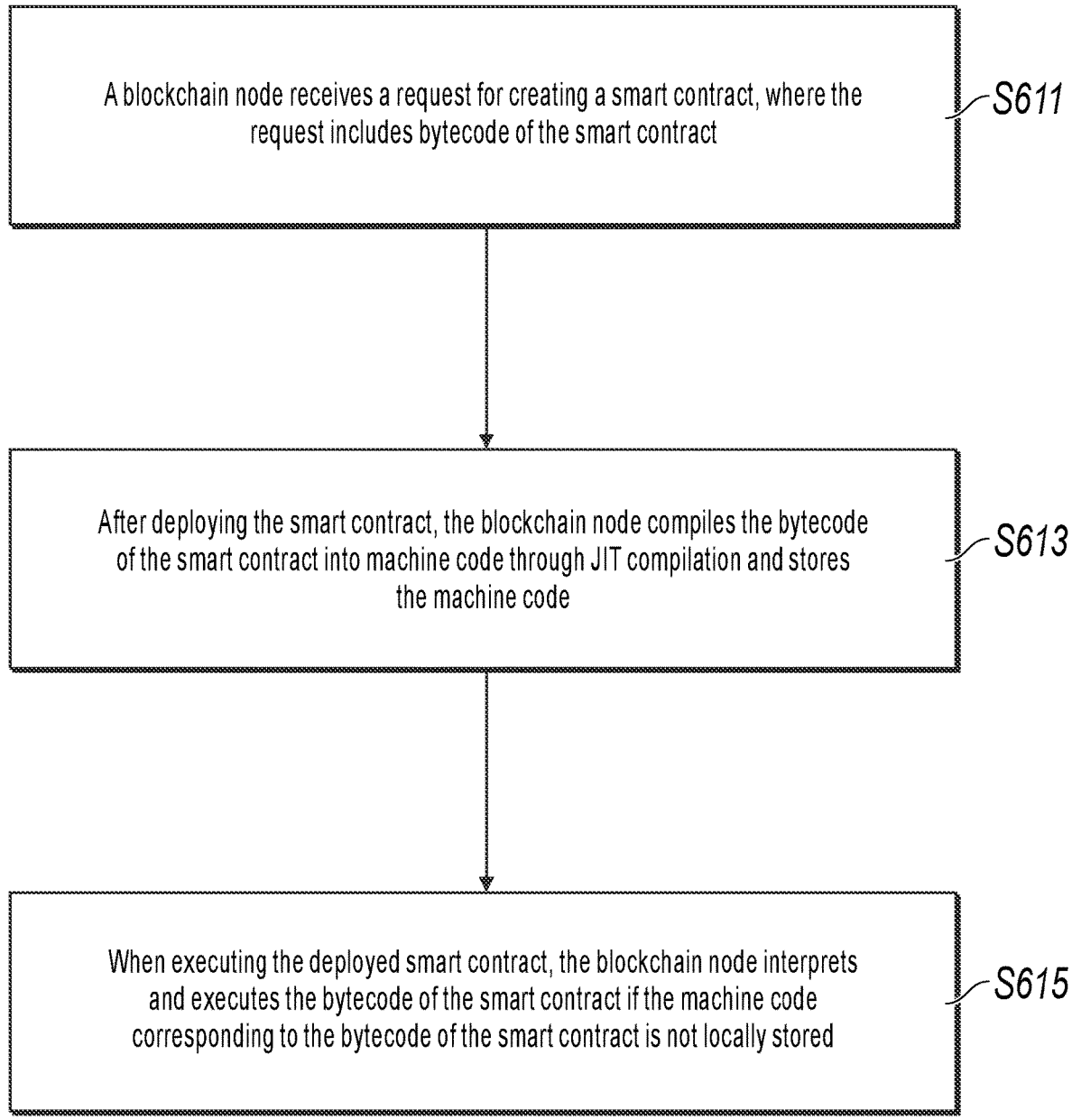
Figures 2, 6:
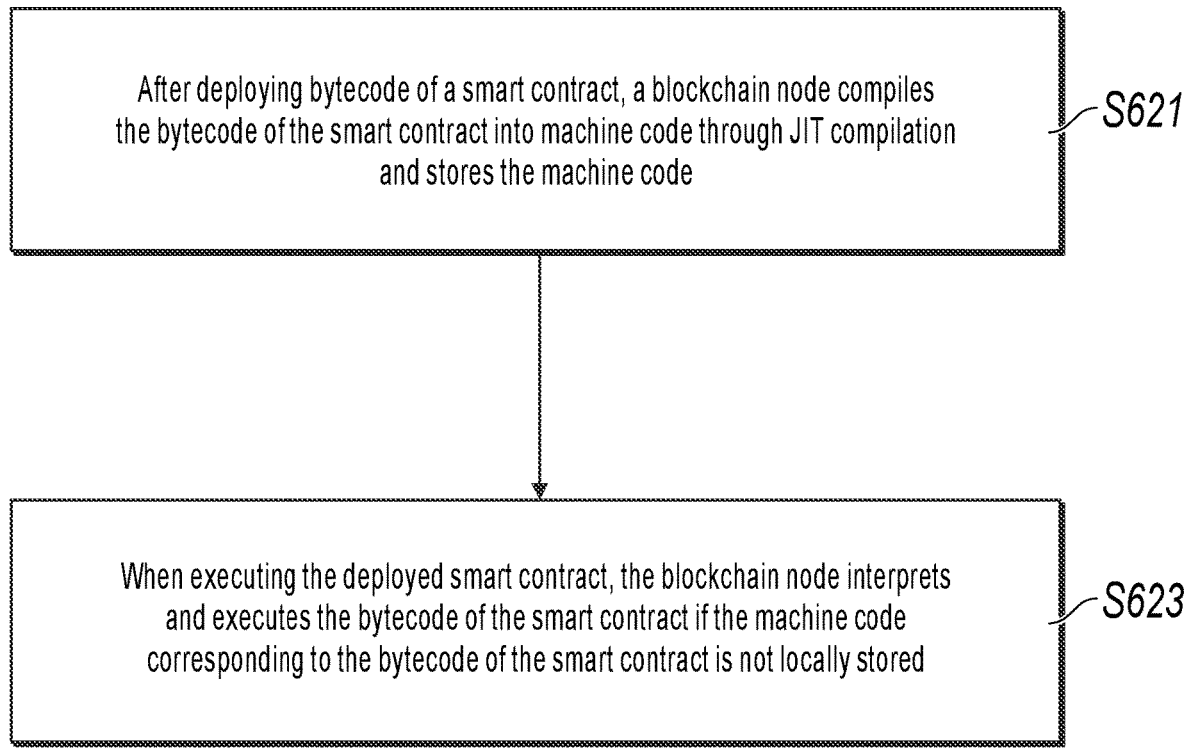

As described above, the JVM has the advantage of cross-platform portability and there is the need to improve performance. Similarly, the EVM in the blockchain can also use technologies such as JIT and AoT to improve the performance of smart contract execution. The present application provides an embodiment of a method for executing a smart contract. As shown in FIG. 6-1, the method includes the following steps.

S611. A blockchain node receives a request for creating a smart contract, where the request includes bytecode of the smart contract.

A user can locally write the smart contract in a high-level language. The written smart contract can be compiled by a compiler to obtain the bytecode. Further, the compiled bytecode of the smart contract can be packed in a transaction by a client and sent to a blockchain network. A format of the transaction is shown, for example, in FIG. 3 to FIG. 5. The bytecode of the smart contract to be created can be stored in a data field of the transaction.

The user can directly write the smart contract in the high-level language at a first blockchain node, and the first blockchain node can compile, through the compiler, the smart contract written in the high-level language, to generate the bytecode.

S613. After deploying the smart contract, the blockchain node compiles the bytecode of the smart contract into machine code through JIT compilation and stores the machine code.

In Ethereum and a similar public blockchian system, a consortium blockchain system, or a private blockchain system, the blockchain node can initiate a consensus for a batch of transactions. The batch of transactions can include the transaction for creating the smart contract. After a consensus is reached, each consensus node usually locally stores the bytecode of the smart contract to be created. Each consensus node can locally execute the transaction for creating the smart contract, create a corresponding contract account, and create an address for the smart contract account based on the same rules. Each consensus node creates the same address for the same contract. As such, the contract is deployed.

After creating the smart contract, in other words, deploying the smart contract, the blockchain node can compile the bytecode of the smart contract into the machine code through JIT compilation and store the machine code. After creating the smart contract, the blockchain node can immediately compile the bytecode of the smart contract through JIT compilation. This is because after the smart contract is deployed, there may soon be a service request for initiating invocation of the deployed smart contract. In addition, many system resources and much time need to be spent for JIT, and when there is a heavy service load at the blockchain node, service processing is affected if system resources are allocated for JIT. Therefore, the blockchain node can alternatively compile the bytecode of the smart contract through JIT compilation in an idle time period, to reduce or avoid impact on service processing. Alternatively, after the blockchain node creates the smart contract, the blockchain node can compile the bytecode of the smart contract through JIT compilation after receiving a transaction request for invoking the created smart contract.

Each blockchain node locally compiles the same bytecode of the smart contract through JIT compilation. Each node only needs to adjust its own processor architecture, running environment, etc., and does not need to compile multiple different versions of machine code. As such, a size of the machine code stored on a node device is greatly reduced, and therefore storage overheads can be reduced.

Preferably, the memory is a cache. Subsequently, a response can be made more quickly by caching into the memory. Specifically, the memory can be a cache area in a virtual machine. Certainly, even if the machine code is stored in a magnetic disk, a response speed can be increased to some extent in many cases.

An EVM in a blockchain uses a JIT technology to improve the performance of smart contract execution. Specifically, this can include the following:

First, hotspot code can be identified in a process of translating and/or executing the bytecode of the smart contract, for example, the number of executions is counted by a code counter of a JIT engine, to obtain, through analysis, bytecode that is executed multiple times, and then translated machine code of the bytecode is cached. Operations that are executed relatively fewer times may not be cached. As such, an optimal balance can be achieved between execution efficiency and memory overheads. In the method for identifying and caching the hotspot code, in a process of executing bytecode multiple times, the bytecode only needs to be translated at the first time, and subsequently cached machine code can be directly used. As such, a process of retranslating the bytecode is omitted, and therefore time is saved. A granularity of identifying the number of executions can be a function level or a code block level. Generally, a code block may be a part of a function, or may include several functions.

In addition, further optimization can be performed in JIT compilation, compilation is performed with reference to contextual relevance of program code, and machine code obtained after optimized compilation is cached for subsequent invocation. Usually, the machine code obtained after optimized compilation is much more efficiently executed than the directly translated machine code. On one hand, the JIT engine can take into consideration hardware and environment information of the blockchain node that performs the compilation, so that the compiled machine code is optimized in terms of hardware+environment. Specifically, the optimization can include optimization in machine code generation, including instruction-level optimization, register allocation and optimization, etc. On the other hand, the JIT engine can analyze context information, for example, a branch jump statement to be executed in a current function, identify a statement with the highest jump probability, and adjust the statement with the highest jump probability to the front, so that the branch statement can be hit first with a higher probability during execution. In the compiler optimization process, dead code can be eliminated through data flow analysis/live variable analysis, for example, a branch that will not be used is eliminated. In addition, a loop statement can be optimized, common word expressions can be replaced, etc.

S615. When executing the deployed smart contract, the blockchain node interprets and executes the bytecode of the smart contract if the machine code corresponding to the bytecode of the smart contract is not locally stored.

After the smart contract is deployed, the contract can be invoked. As such, a client (which may be different from the client in S611 that initiates the transaction for creating the contract) can initiate invocation of the contract. For example, the client initiates a transaction in which a to field is an address of the deployed smart contract, and a data field can include a method for invoking the contract and input parameters, to implement invocation of the deployed smart contract. Usually, after a consensus is reached on a batch of transactions including the transaction for invoking the contract, each consensus node executes each of the transactions.

When executing the deployed smart contract, the blockchain node can first check whether the machine code of the contract to be invoked is locally stored. If the machine code of the contract to be invoked is locally stored, it indicates that the bytecode of the smart contract has been locally compiled through JIT compilation. The blockchain node then can directly execute machine code corresponding to a function to be invoked and/or a code block in the smart contract, and input the input parameters specified in the previously described data field.

When the machine code of the smart contract is stored, the blockchain node can greatly increase the speed of executing the smart contract because the machine code can be directly executed by a CPU (under the control of an OS). In addition, when the machine code of the smart contract is cached in a memory, the speed of executing the smart contract can be further increased. Certainly, even if the machine code is stored in a magnetic disk, the execution speed can be increased to some extent.

When executing the machine code, the blockchain node can specifically execute the stored machine code corresponding to the function to be invoked and/or the code block in the smart contract.

Further, when the blockchain node executes the deployed smart contract, if the machine code of the smart contract is not locally stored, the blockchain node can interpret and execute the bytecode of the deployed smart contract without waiting for completion of JIT compilation. To make a timely response to a service request, in other words, to make a quick response to the service request for initiating invocation of the deployed smart contract, the blockchain node can query whether there is machine code of the smart contract to be invoked. If there is machine code of the smart contract to be invoked, it indicates that JIT compilation has been completed. If there is no machine code of the smart contract to be invoked, it indicates that JIT compilation has not been started or completed. If there is machine code, as described above, the blockchain node can execute the machine code when executing the deployed smart contract, so that the speed of executing the smart contract can be greatly increased. If there is no machine code, the blockchain node queries a current JIT compilation status of the bytecode of the smart contract, which may specifically include two cases:

Case 1: When the blockchain node executes the deployed smart contract, if the machine code of the smart contract is not locally stored, the blockchain node further queries the current JIT compilation status of the bytecode of the smart contract, and interprets and executes the bytecode of the smart contract if the bytecode of the smart contract is being compiled through JIT compilation.

If the machine code of the smart contract is not locally stored, the blockchain node can query the current JIT compilation status of the bytecode of the smart contract, and a query result can be that the bytecode of the smart contract is being compiled through JIT compilation. A quick response is preferred for some service requests for invoking the smart contract, and is also an objective of various blockchain systems seeking to increase transactions per second (TPS). When the smart contract to be invoked is being compiled through JIT compilation, to make a quick response, the blockchain node can interpret and execute the bytecode of the smart contract without waiting for completion of JIT compilation.

Case 2: When the blockchain node executes the deployed smart contract, if the machine code of the smart contract is not locally stored, the blockchain node further queries the current JIT compilation status of the bytecode of the smart contract, and if JIT compilation has not been started, starts JIT compilation, and interprets and executes the bytecode of the smart contract.

Similar to Case 1, when JIT has not been started for the smart contract to be invoked, to make a quick response, the blockchain node can interpret and execute the bytecode of the smart contract. In addition, when JIT has not been started, the blockchain node can start JIT compilation.

When interpreting and executing the bytecode of the smart contract, the blockchain node can translate the bytecode of the smart contract sentence by sentence by using the EVM, and execute the translated machine code piece by piece. In addition to the EVM, there can be a WASM virtual machine, a JavaScript virtual machine (JSVM), etc. Here, description is mainly provided by using the EVM as an example.

The blockchain node stores the compiled machine code after completing JIT compilation of the smart contract. As such, when the blockchain node executes the deployed smart contract, if the machine code for the contract to be invoked that is obtained after JIT compilation is locally stored, it indicates that JIT compilation of the bytecode of the smart contract has been locally completed. The blockchain node then can directly execute the machine code that is obtained through JIT compilation and corresponds to the function to be invoked in the smart contract, and input the input parameters specified in the previously described data field.

It is worthwhile to note that the blockchain node in S611 may be different from the blockchain node in S613 and S615. This is because in the blockchain that serves as a distributed system, a node that receives a transaction, a node that initiates a consensus, and a node that executes a transaction can be different nodes, and certainly can be the same node.

Another embodiment of a method for executing a smart contract according to the present application is described below with reference to FIG. 6-2. The method includes the following steps.

S621. After deploying bytecode of a smart contract, a blockchain node compiles the bytecode of the smart contract into machine code through JIT compilation and stores the machine code.

After deploying the bytecode of the smart contract, the blockchain node compiles the bytecode of the smart contract into the machine code through JIT compilation and stores the machine code, which can specifically include the following:

The blockchain node immediately compiles the bytecode of the smart contract through JIT compilation after creating the smart contract; or the blockchain node compiles the bytecode of the smart contract through JIT compilation in an idle time period after creating the smart contract; or the blockchain node compiles the bytecode of the smart contract through JIT compilation after receiving a transaction request for invoking the created smart contract.

The compiling bytecode of a smart contract into machine code through JIT compilation and storing the machine code includes:

identifying hotspot bytecode for compilation and storage in a process of translating and/or executing the bytecode of the smart contract; and/or performing optimized compilation and storing optimized machine code in the process of translating and/or executing the bytecode of the smart contract.

A granularity of identifying the hotspot bytecode includes a function level or a code block level.

S623. When executing the deployed smart contract, the blockchain node executes the machine code if the machine code of the smart contract is locally stored.

When executing the machine code, the blockchain node can execute stored machine code corresponding to a function to be invoked and/or a code block in the smart contract.

In addition, when executing the deployed smart contract, the blockchain node can interpret and execute the bytecode of the smart contract if the machine code of the smart contract is not locally stored.

A specific method for storing the machine code can be caching the machine code. Subsequently, a response can be made more quickly by caching into a memory. Certainly, even if the machine code is stored in a magnetic disk, a response speed can be increased to some extent in many cases.

That the blockchain node interprets and executes the bytecode of the smart contract can include the following:

The blockchain node interprets and executes bytecode corresponding to a function to be invoked in the smart contract.

When executing the deployed smart contract, the blockchain node interprets and executes the bytecode of the smart contract if the machine code of the smart contract is not locally stored, which can specifically include the following:

When the blockchain node executes the deployed smart contract, if the machine code of the smart contract is not locally stored, the blockchain node further queries a current JIT compilation status of the bytecode of the smart contract, and interprets and executes the bytecode of the smart contract if the bytecode of the smart contract is being compiled through JIT compilation; or when the blockchain node executes the deployed smart contract, if the machine code of the smart contract is not locally stored, the blockchain node further queries a current JIT compilation status of the bytecode of the smart contract, and if JIT compilation has not been started, starts JIT compilation, and interprets and executes the bytecode of the smart contract.

Figure 7:
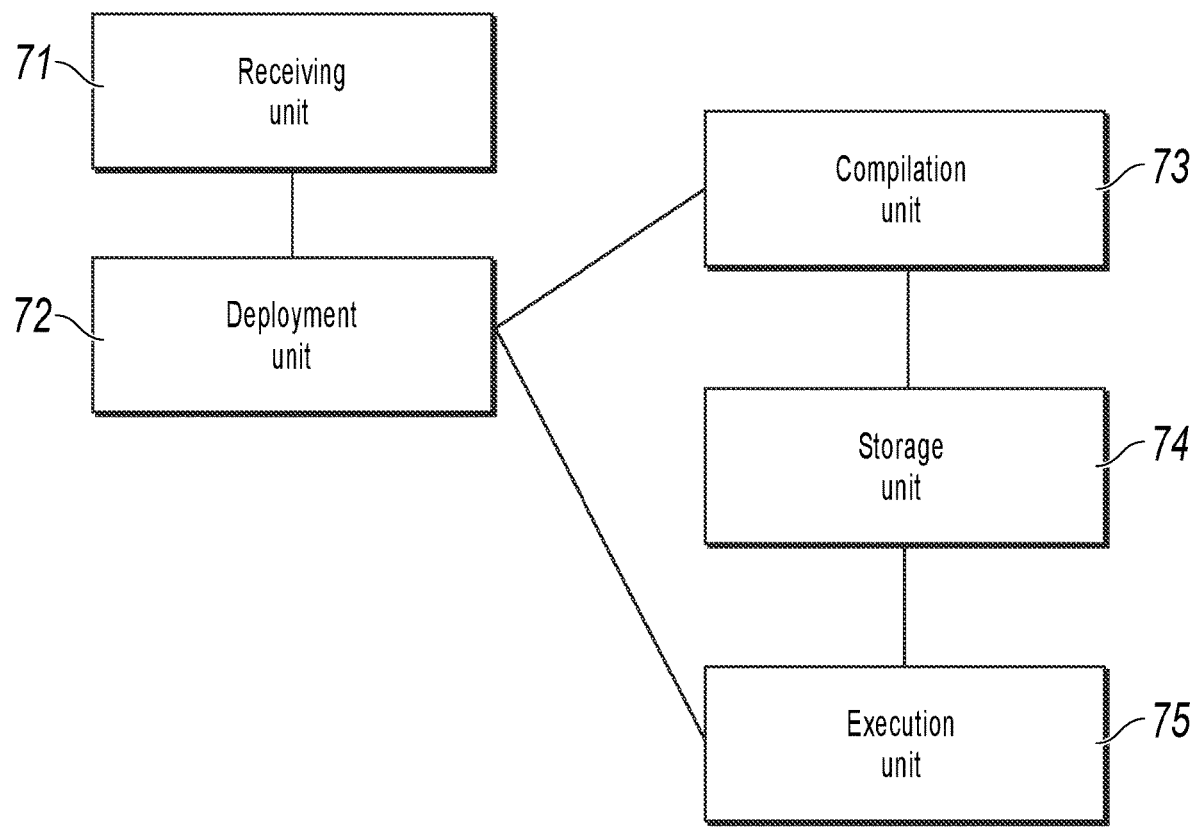
FIG. 7 is a modular structural diagram illustrating a blockchain node, according to embodiments.

An embodiment of a blockchain node for executing a smart contract according to the present application is described below. As shown in FIG. 7, the blockchain node includes:

a receiving unit 71, configured to receive a request for creating a smart contract, where the request includes bytecode of the smart contract;

a deployment unit 72, configured to deploy the smart contract based on the request that is for creating the smart contract and received by the receiving unit 71;

a compilation unit 73, configured to compile the bytecode of the smart contract into machine code through JIT compilation after the deployment unit 72 deploys the smart contract;

a storage unit 74, configured to store the machine code obtained through compilation by the compilation unit 73; and an execution unit 75, configured to execute, when receiving an invocation for the deployed smart contract, the machine code if the storage unit 74 stores the machine code of the smart contract.

That a compilation unit 73 is configured to compile the bytecode of the smart contract into machine code through JIT compilation after the deployment unit 72 deploys the smart contract includes the following:

The compilation unit 73 is configured to immediately compile the bytecode of the smart contract through JIT compilation after the deployment unit 72 creates the smart contract; or the compilation unit 73 is configured to compile the bytecode of the smart contract through JIT compilation in an idle time period after the deployment unit 72 creates the smart contract; or the compilation unit 73 is configured to compile the bytecode of the smart contract through JIT compilation after the execution unit 75 receives the transaction request for invoking the created smart contract.

The storage unit 74 can be a memory or a magnetic disk storage.

That an execution unit 75 is configured to execute the machine code includes the following: The execution unit 75 is configured to execute stored machine code corresponding to a function to be invoked and/or a code block in the smart contract.

When executing the deployed smart contract, the execution unit 75 interprets and executes the bytecode of the smart contract if the storage unit 74 does not store the machine code of the smart contract.

That the execution unit 75 interprets and executes the bytecode of the smart contract includes the following:

The execution unit 75 interprets and executes bytecode corresponding to a function to be invoked in the smart contract.

That when the deployment unit 72 executes the deployed smart contract, the execution unit 75 interprets and executes the bytecode of the smart contract if the storage unit 74 does not store the machine code of the smart contract includes the following:

When the execution unit 75 executes the deployed smart contract, if the storage unit 74 does not store the machine code of the smart contract, the execution unit 75 further queries a current JIT compilation status of the bytecode of the smart contract, and interprets and executes the bytecode of the smart contract if the bytecode of the smart contract is being compiled through JIT compilation; or When the execution unit 75 executes the deployed smart contract, if the storage unit 74 does not store the machine code of the smart contract, the execution unit 75 further queries a current JIT compilation status of the bytecode of the smart contract, and if AoT compilation has not been started, starts JIT compilation, and interprets and executes the bytecode of the smart contract.

That the execution unit 75 interprets and executes the bytecode of the smart contract includes the following:

Further, the blockchain node for executing a smart contract can also perform the method in S621 to S623.

The present application further provides an embodiment of a blockchain node. The blockchain node includes:

a processor; and a memory. The memory stores a program, and when the processor executes the program, a smart contract is executed based on the previously described method.

The present application further provides an embodiment of a storage medium. The storage medium is configured to store a program, and when the program is executed, the previously described method is performed.

In the 1990s, whether a technical improvement is a hardware improvement (for example, an improvement of a circuit structure, such as a diode, a transistor, or a switch) or a software improvement (an improvement of a method procedure) can be clearly distinguished. However, as technologies develop, current improvements of many method procedures can be considered as direct improvements of hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, a computer-readable medium that stores computer readable program code (such as software or firmware) that can be executed by a microprocessor or a processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of a logic gate, a switch, an application-specific integrated circuit, a programmable logic controller, and a built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously described embodiments can be specifically implemented by a computer chip or an entity, or can be implemented by a product having a certain function. A typical implementation device is a server system. Certainly, in the present application, with the development of future computer technologies, the computer for implementing the functions of the embodiments can be, for example, a personal computer, a laptop computer, an in-vehicle man-machine interaction device, a cellular phone, a camera phone, a smartphone, a personal digital assistant, a media player, a navigation device, an email device, a game console, a tablet computer, a wearable device, or a combination of any of these devices.

Although operation steps of the methods in the embodiments or the flowcharts are provided in one or more embodiments of the present specification, more or fewer operation steps can be included based on conventional or noncreative means. The sequence of the steps listed in the embodiments is merely one of numerous step execution sequences, and does not represent the unique execution sequence. For an actual apparatus or terminal product, the steps can be performed based on the method sequence in the embodiments or accompanying drawings or performed in parallel (for example, in an environment of parallel processing or multi-threaded processing, or even in a distributed data processing environment). The term "include", "comprise", or their any other variants are intended to cover a nonexclusive inclusion, so that a process, a method, a product, or a device that includes a series of elements not only includes these elements, but also includes other elements which are not expressly listed, or further includes elements inherent to such process, method, product, or device. The process, method, product, or device that includes the elements further includes, without more constraints, other same or identical elements. For example, words such as "first" and "second" do not represent any sequence if the words such as "first" and "second" are used to denote names.

For ease of description, the previous apparatus is described by dividing the functions into various modules. Certainly, when one or more embodiments of the present specification are implemented, functions of various modules can be implemented in one or more pieces of software and/or hardware, modules that implement the same function can be implemented by using a combination of multiple submodules or subunits, etc. The described apparatus embodiments are merely examples. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

The present invention is described with reference to the flowcharts and/or block diagrams of the method, the apparatus (system), and the computer program product based on the embodiments of the present invention. It should be understood that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct a computer or another programmable data processing device to work in a specific way, so that the instructions stored in the computer-readable memory generate a product that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer-readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage, graphene storage or another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

A person skilled in the art should understand that one or more embodiments of the present specification can be provided as a method, a system, or a computer program product. Therefore, one or more embodiments of the present specification can use a form of hardware only embodiments, software only embodiments, or embodiments with a combination of software and hardware. In addition, one or more embodiments of the present specification can use a form of a computer program product that is implemented on one or more computer-usable storage media (including but not limited to a disk memory, a CD-ROM, an optical memory, etc.) that include computer-usable program code.

One or more embodiments of the present specification can be described in the general context of computer-executable instructions executed by a computer, for example, a program module. The program module usually includes a routine, a program, an object, a component, a data structure, etc. for executing a specific task or implementing a specific abstract data type. One or more embodiments of the present specification can be practiced in distributed computing environments. In the distributed computing environments, tasks are performed by remote processing devices that are connected through a communications network. In the distributed computing environment, the program module can be located in both local and remote computer storage media including storage devices.

The embodiments of the present specification are described in a progressive way. For same or similar parts in the embodiments, references can be made to these embodiments, and each embodiment focuses on a difference from other embodiments. Particularly, the system embodiments are basically similar to the method embodiments, and therefore are described briefly. For related parts, references can be made to partial description in the method embodiments. In the description of the present specification, reference terms such as "an embodiment", "some embodiments", "example", "specific example", and "some examples" mean that specific features, structures, materials, or characteristics described with reference to the embodiment or example are included in at least one embodiment or example of the present specification. In the present specification, the example expressions of the previous terms are not necessarily with respect to the same embodiments or examples. In addition, the described specific features, structures, materials, or characteristics can be combined in a proper way in any one or more of the embodiments or examples. Further, a person skilled in the art can integrate or combine different embodiments or examples and features in different embodiments or examples described in the present specification provided that they do not conflict with each other.

The previous descriptions are merely one or more embodiments of the present specification, and are not intended to limit the one or more embodiments of the present specification. For a person skilled in the art, the one or more embodiments of the present specification can have various modifications and changes. Any modifications, equivalent replacements, and improvements made within the spirit and the principle of the present specification shall fall within the scope of the claims.

What is claimed is:

1. A computer-implemented method performed by a blockchain node of a blockchain, comprising:
    receiving bytecode of a smart contract;
    deploying the smart contract, comprising storing the bytecode of the smart contract on the blockchain;
    compiling, through Just-In-Time (JIT) compilation, the bytecode of the smart contract to obtain machine code corresponding to the bytecode of the smart contract;
    locally storing the machine code corresponding to the bytecode of the smart contract in a memory that is local to the blockchain node; and
    executing the smart contract deployed on the blockchain, comprising
        determining whether the machine code corresponding to the bytecode of the smart contract is locally stored in the memory that is local to the blockchain node, and
        in response to determining that the machine code corresponding to the bytecode of the smart contract is not stored in the memory that is local to the blockchain node, before the JIT compilation of the bytecode of the smart contract is completed, interpreting and executing the bytecode of the smart contract if the machine code corresponding to the bytecode of the smart contract is not locally stored.

2. The computer-implemented method according to claim 1, wherein compiling, through Just-In-Time (JIT) compilation, the bytecode of the smart contract to obtain the machine code comprises:
    compiling the bytecode of the smart contract through JIT compilation immediately after deploying the smart contract; or
    compiling the bytecode of the smart contract through JIT compilation during an idle time period after deploying the smart contract; or
    compiling the bytecode of the smart contract through JIT compilation in response to receiving a transaction request for invoking the smart contract that has been deployed.

3. The computer-implemented method according to claim 1, wherein compiling, through Just-In-Time (JIT) compilation, the bytecode of the smart contract to obtain the machine code comprises:
    compiling hotspot bytecode that has been identified from the bytecode of the smart contract during a process of translating or executing the bytecode of the smart contract; or
    performing optimizing compilation during the process of translating or executing the bytecode of the smart contract.

4. The computer-implemented method according to claim 3, wherein a granularity of identifying the hotspot bytecode comprises a function level or a code block level.

5. The computer-implemented method according to claim 1, wherein interpreting and executing the bytecode of the smart contract if the machine code corresponding to the bytecode of the smart contract is not locally stored comprises:
    querying a current JIT compilation status of the bytecode of the smart contract; and
    interpreting and executing the bytecode of the smart contract if the current JIT compilation status specifies that the bytecode of the smart contract is currently being compiled through JIT compilation.

6. The computer-implemented method according to claim 5, further comprising:
    if the current JIT compilation status specifies that a JIT compilation has not been started, starting the JIT compilation, and interpreting and executing the bytecode of the smart contract.

7. The computer-implemented method according to claim 1, wherein interpreting and executing the bytecode of the smart contract comprises:
    interpreting and executing bytecode that corresponds to a function invoked in the smart contract.

8. The computer-implemented method according to claim 1, wherein executing the smart contract deployed on the blockchain further comprises:
    executing the machine code if the machine code corresponding to the bytecode of the smart contract is locally stored in the memory that is local to the blockchain node.

9. The computer-implemented method according to claim 8, wherein executing the machine code comprises:
    executing machine code that corresponds to a function invoked in the smart contract or a code block of the smart contract.

10. The computer-implemented method according to claim 1, wherein the memory is a cache.

11. The computer-implemented method according to claim 1, wherein receiving the bytecode of the smart contract comprises:
    receiving a request for creating the smart contract, wherein the request comprises the bytecode of the smart contract.

12. A computer-implemented system, comprising:
    one or more computers; and
    one or more computer memory devices interoperably coupled with the one or more computers and having tangible, non-transitory, machine-readable media storing one or more instructions that, when executed by the one or more computers, perform operations comprising:
        receiving, by a blockchain node of a blockchain, bytecode of a smart contract;

deploying, by the blockchain node, the smart contract, comprising storing the bytecode of the smart contract on the blockchain;

compiling, by the blockchain node and through Just-In-Time (JIT) compilation, the bytecode of the smart contract to obtain machine code corresponding to the bytecode of the smart contract;

locally storing, by the blockchain node, the machine code corresponding to the bytecode of the smart contract in a memory that is local to the blockchain node; and executing, by the blockchain node, the smart contract deployed on the blockchain, comprising determining whether the machine code corresponding to the bytecode of the smart contract is locally stored in the memory that is local to the blockchain node, and in response to determining that the machine code corresponding to the bytecode of the smart contract is not stored in the memory that is local to the blockchain node, before the JIT compilation of the bytecode of the smart contract is completed, interpreting and executing the bytecode of the smart contract if the machine code corresponding to the bytecode of the smart contract is not locally stored.

13. The computer-implemented system according to claim 12, wherein compiling, through Just-In-Time (JIT) compilation, the bytecode of the smart contract to obtain the machine code comprises:

compiling the bytecode of the smart contract through JIT compilation immediately after deploying the smart contract; or compiling the bytecode of the smart contract through JIT compilation during an idle time period after deploying the smart contract; or compiling the bytecode of the smart contract through JIT compilation in response to receiving a transaction request for invoking the smart contract that has been deployed.

14. The computer-implemented system according to claim 12, wherein compiling, through Just-In-Time (JIT) compilation, the bytecode of the smart contract to obtain the machine code comprises:

compiling hotspot bytecode that has been identified from the bytecode of the smart contract during a process of translating or executing the bytecode of the smart contract; or performing optimizing compilation during the process of translating or executing the bytecode of the smart contract.

15. The computer-implemented system according to claim 14, wherein a granularity of identifying the hotspot bytecode comprises a function level or a code block level.

16. The computer-implemented system according to claim 12, wherein interpreting and executing the bytecode of the smart contract if the machine code corresponding to the bytecode of the smart contract is not locally stored comprises:

querying a current JIT compilation status of the bytecode of the smart contract; and interpreting and executing the bytecode of the smart contract if the current JIT compilation status specifies that the bytecode of the smart contract is currently being compiled through JIT compilation.

17. The computer-implemented system according to claim 16, wherein the operations further comprise:

if the current JIT compilation status specifies that a JIT compilation has not been started, starting the JIT compilation, and interpreting and executing the bytecode of the smart contract.

18. The computer-implemented system according to claim 12, wherein interpreting and executing the bytecode of the smart contract comprises:

interpreting and executing bytecode that corresponds to a function invoked in the smart contract.

19. The computer-implemented system according to claim 12, wherein executing the smart contract deployed on the blockchain further comprises:

executing the machine code if the machine code corresponding to the bytecode of the smart contract is locally stored in the memory that is local to the blockchain node.

20. A non-transitory, computer-readable medium storing one or more instructions executable by a computer system to perform operations comprising:

receiving, by a blockchain node of a blockchain, bytecode of a smart contract;

deploying, by the blockchain node, the smart contract, comprising storing the bytecode of the smart contract on the blockchain;

compiling, by the blockchain node and through Just-In-Time (JIT) compilation, the bytecode of the smart contract to obtain machine code corresponding to the bytecode of the smart contract;

locally storing, by the blockchain node, the machine code corresponding to the bytecode of the smart contract in a memory that is local to the blockchain node; and executing, by the blockchain node, the smart contract deployed on the blockchain, comprising determining whether the machine code corresponding to the bytecode of the smart contract is locally stored in the memory that is local to the blockchain node, and in response to determining that the machine code corresponding to the bytecode of the smart contract is not stored in the memory that is local to the blockchain node, before the JIT compilation of the bytecode of the smart contract is completed, interpreting and executing the bytecode of the smart contract if the machine code corresponding to the bytecode of the smart contract is not locally stored.

* * * * *